United States Patent [19]

Smith

[11] Patent Number: 5,146,769
[45] Date of Patent: Sep. 15, 1992

[54] LOCKING DEVICE FOR A VIDEO GAME ELECTRONIC APPARATUS AND METHOD THEREFOR

[76] Inventor: Martin C. Smith, 18624 N. 15th Pl., Phoenix, Ariz. 85024

[21] Appl. No.: 814,619

[22] Filed: Dec. 30, 1991

Related U.S. Application Data

[63] Continuation-in-part of Ser. No. 562,264, Aug. 3, 1990, Pat. No. 5,124,871, and a continuation-in-part of Ser. No. 716,829, Jun. 17, 1991.

[51] Int. Cl.⁵ .............................................. E05B 73/00
[52] U.S. Cl. ............................................. 70/14; 70/58
[58] Field of Search ............... 70/14, 57, 58, 163–173, 70/401, 407, 409, 416

[56] References Cited

U.S. PATENT DOCUMENTS

| | | | |
|---|---|---|---|
| 4,527,405 | 7/1985 | Renick et al. | 70/14 |
| 4,616,490 | 10/1986 | Robbins | 70/14 |
| 4,922,734 | 5/1990 | Iannucci | 70/58 |

Primary Examiner—Renee S. Luebke
Assistant Examiner—Suzanne L. Dino
Attorney, Agent, or Firm—Harry M. Weiss

[57] ABSTRACT

This disclosure is directed to a selectively lockable or unlockable video game electronic apparatus for permitting the playing of video games only when the apparatus is unlocked. This apparatus is a video game console that uses a locking device which comprises a housing that is placed at the opening of the game cartridge slot of the video game electronic console or apparatus, thereby preventing entry of a video game cartridge into the console or apparatus, which means that the console or apparatus is locked. The locking device further comprises a key mechanism located within the housing which, when pushed inwardly, moves two spring-loaded locking cams, which have extension portions to permit the locking device to lock or engage within recesses located in an empty video game cartridge opening in the video game electronic console or apparatus. The removal of the locking device from the console is impossible until the key is used to retract the locking cams.

3 Claims, 1 Drawing Sheet

LOCKING DEVICE FOR A VIDEO GAME ELECTRONIC APPARATUS AND METHOD THEREFOR

RELATED APPLICATION

This patent application is a continuation-in-part of my earlier patent application entitled "LOCKING DEVICE FOR A VIDEO CASSETTE ELECTRONIC APPARATUS AND METHOD THEREFOR", Ser. No. 07/562,264, filed Aug. 3, 1990, now U.S. Pat. No. 5,124,871, and of my earlier patent application entitled "LOCKING DEVICE FOR A VIDEO GAME ELECTRONIC 7 APPARATUS AND METHOD THEREFOR", Ser. No. 07/716,829, filed Jun. 17, 1991.

FIELD OF THE INVENTION

This invention relates generally to locking devices and methods therefor, and, more specifically, to a locking device for a video game electronic apparatus and method therefor wherein the locking device is installed in the video game cartridge opening of a video game apparatus, which device comprises a locking mechanism such as a lock and key which, once locked into place, prevents game cartridges from being inserted into the video game console of the video game apparatus, thereby preventing use of the video game console and, correspondingly, the video game apparatus.

DESCRIPTION OF THE PRIOR ART

The prior art video game console of a video game apparatus usually included a housing having a video game cartridge recess and further included operating or control means for the console that generally used manual controls extending from the front wall of the console, and connector means for connecting remote control units to the video game console. With the rising popularity of home video games, especially the NINTENDO and other well-known video games which are coupled to T.V. type screens for viewing, more people, especially children, are spending an increasing amount of time each day playing video games at home using a video game console which accepts game cartridges for the different games which can be played.

One problem with the prior art video game console is that it was extremely difficult to prevent the use of the video game console by a child or children, especially if a parent felt that the play of the video game was interfering with other activities of a child such as homework, school work, reading, sports, sleeping, eating, etc. Previously anyone could simply insert any suitable video game cartridge into any video game console and play the game using the video game console. Because of the relative complexity in the controls or electrical couplings between the video game console and the associated T.V. set or screen, it was not very practical for a parent to control the amount of time the video games could be played.

Locking devices for cassette tape players, video cassette recorders (VCRs) and other electronic devices have been disclosed in several prior U.S. patents. Many of these locking devices are complex in construction, having many moving parts. Some are so simple that the locking feature is not reliable or is easily defeated. For these reasons, a need existed to provide a means for locking a video game console in such a way that undesired use of the video game console is prevented using a device that is simple and inexpensive, yet provides reliable locking of the video game console.

SUMMARY OF THE INVENTION

It is an object of this invention to provide an improved locking device and method for a video game electronic apparatus.

It is another object of this invention to provide an improved locking device and method for NINTENDO and other video game consoles of video game electronic apparatus'.

According to the present invention, a video game console for a video game electronic apparatus is provided. The present invention is intended specifically for NINTENDO brand video game consoles, which have a special cartridge tray wherein the video game cartridges are placed. Once the video game cartridge is correctly placed within the cartridge tray, the exposed portion of the game cartridge is pressed downward, which causes the cartridge tray to pivot down and click into place. This locks the video game in place, and the game is now ready to be played with the video game console and controls. When the video game console is to be locked, the video game cartridge is removed from the video game console. The cartridge tray must then be pressed down into the position that normally would lock a game cartridge in place if one were present. Depressing the empty cartridge tray makes small openings at the side of the video game cartridge opening available for the locking device to engage.

The apparatus of the present invention comprises, in combination with a video game console, locking device means for the apparatus to prevent use of a video game cartridge in the video game console. With the cartridge tray in the down position, the locking device is placed in the video game cartridge opening of the video game console and has lock means for locking the device in the video game cartridge opening of the video game console of the video game electronic apparatus.

By using this locking device in the video game cartridge opening and by activating locking of the device in the video game cartridge opening through use of the lock means associated with the locking device, the prior problem of not being able to prevent unwanted use of the video game console is avoided. This locking device can be rapidly installed into the video game console and also rapidly removed from the video game console, thereby providing a rapid or quick mechanical (non-electronic) and reliable means for effectively preventing or permitting use of the video game console. This locking device is simple in construction, yet provides a very reliable locking mechanism which is not easily defeated.

The foregoing and other objects, features and advantages will be apparent from the following description of the preferred embodiment of the invention as illustrated in the accompanying drawings.

DESCRIPTION OF THE PREFERRED EMBODIMENT

In accordance with one embodiment of this invention, a device and method for locking a video game console of a video game electronic apparatus is disclosed, comprising: a locking device which fits into the game cartridge slot of a video game console, locking means for securing the device in place inside the video game cartridge slot of the video game console, and key means for actuating said locking means to lock the locking device in place within the game cartridge slot to prevent the insertion of game cartridges therein, and to unlock the locking device and thereby remove the locking device from the video game cartridge slot to permit the insertion of game cartridges therein.

Figure 1:
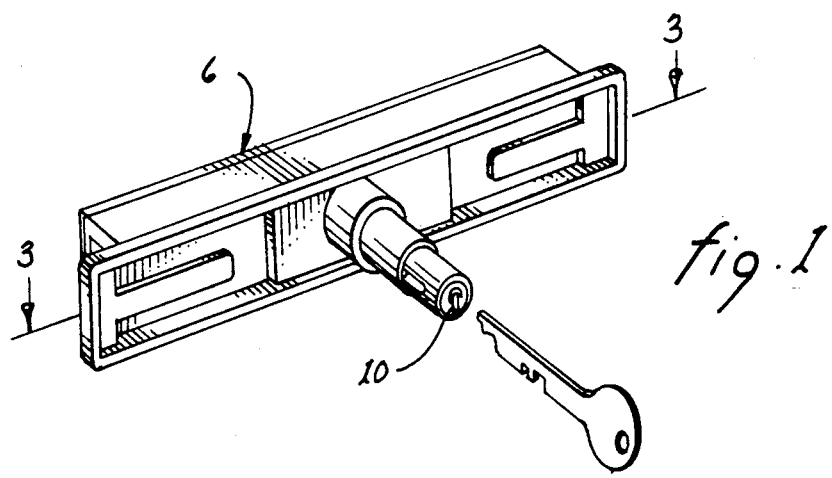
FIG. 1 is a perspective view of the locking device with the key used for locking and unlocking the locking device.

Referring to FIG. 1, locking device 6 is shown, which fits into a video game cartridge opening of a video game console (not shown). This locking device 6 is locked into place by pushing inwardly key mechanism 22. The device 6 can be locked into place with or without key 9 as shown.

Figure 2:
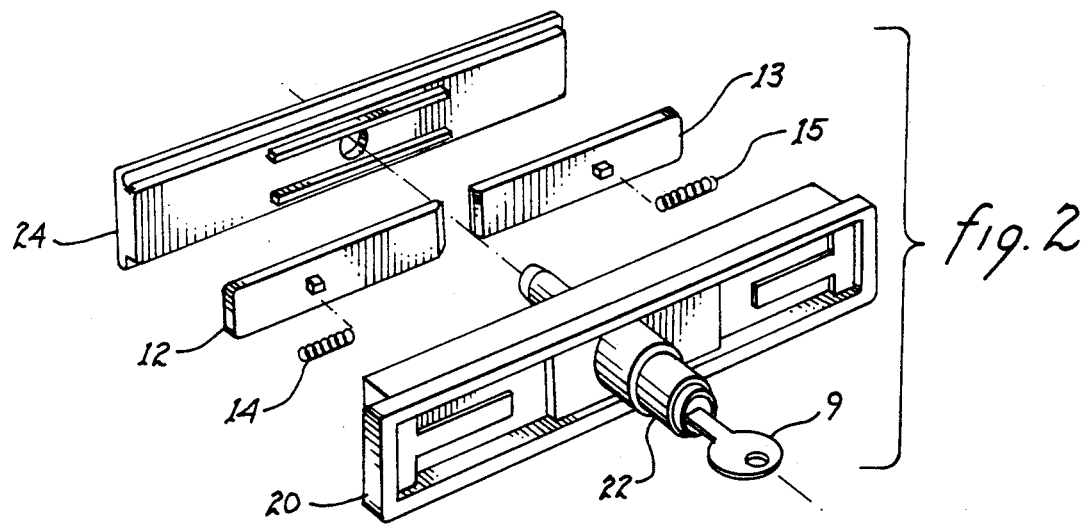
FIG. 2 is an exploded perspective view of the locking device shown in FIG. 1.

FIG. 2 shows an exploded view of the locking device 6. Locking device 6 has a front plate 20, with a key mechanism 22 and associated actuator 11. The device 6 also has a back plate 24 as shown. Installed between the front plate 20 and the back plate 24 are left cam 12 with associated left spring 14, and right cam 13 with associated right spring 15

Figure 3:
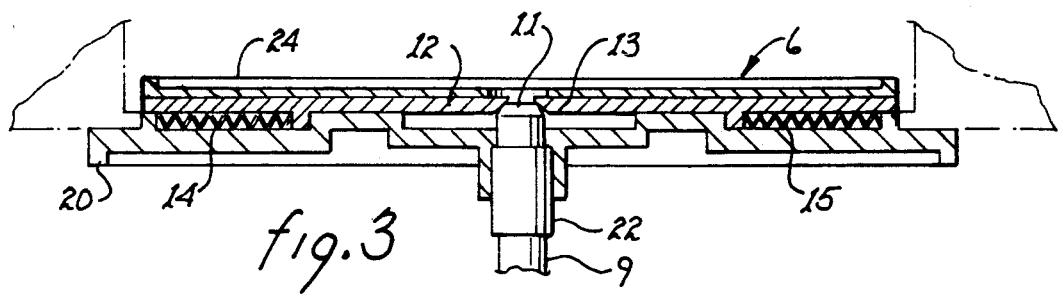
FIG. 3 is a cross-sectional view of the locking device shown in FIG. 1 taken along the line 3—3 with the key in the unlocked position.

FIG. 3 shows a cross-sectional view of the locking device 6 in its unlocked position. Before the locking device 6 is inserted into the video game console, the actuator 11 is in its retracted position as shown in FIG. 3. Springs 14 and 15 (see FIG. 2) (which are each bounded by two stop cause the respective locking cams 12 and 13 to be normally pushed or biased inwardly by virtue of the inward force exerted on the stop that is attached to each of the cams 12 and 13) against or in contact with reduced diameter portion of actuator 11 as shown in FIG. 3. The two locking cams 12 and 13 are preferably identical to allow for a lower manufacturing cost, and are shown in more detail in FIG. 2. When the actuator 11 is in the position shown in FIG. 3, the springs (14,15) cause the cams (12,13) to be wedged or biased in a position closest to each other and only separated by the reduced diameter portion of actuator 11. In this manner the cams 12 and 13 are in their retracted position, and the locking device 6 is therefore in its unlocked state.

Prior to installing the locking device 6 on a video game console, the empty cartridge tray of the game unit or console must be depressed to its lower position. With the empty cartridge tray in its lower position, there exist small openings inside the video game cartridge opening of the video game console that allow cam 12 and 13 to engage the side wall of the video game console, thereby locking the locking device 6 in place.

Once the locking device 6 is placed into the video game cartridge opening of a video game console, the key 9 is preferably inserted into key mechanism 22 as shown in FIG. 1. Once the mechanism is fully pressed in it is locked in place and to unlock the mechanism the clockwise (see FIGS. 1 and 2) to unlock the mechanism.

Figure 4:
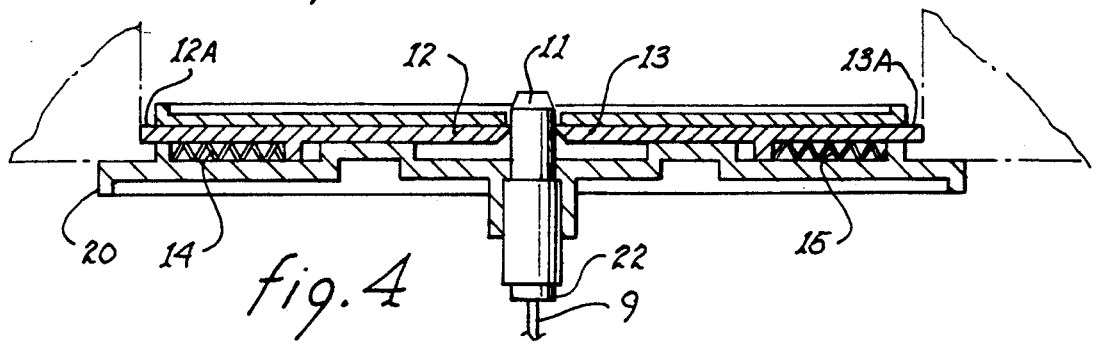
FIG. 4 is a cross-sectional view of the locking device shown in FIG. 1 taken along the line 3—3 with the key in the locked position.

This movement of actuator 11 causes the spring-loaded cams 12 and 13 to move from the reduced diameter portion of actuator 11 as shown in FIG. 3 to the portion of actuator 11 that is the nominal diameter of the actuator 11, as shown in FIG. 4. In this manner the actuator 11 pushes spring-loaded cams 12 and 13 against the inward biasing action of the springs 14 and 15, thereby extending the end portions 12A and 13A of cams 12 and 13 as shown in FIG. 4. End portions 12A and 13A of cams 12 and 13 engage the side walls of the video game cartridge opening of the video game console, thereby locking the locking device 6 in place. Key 9 is then removed from revise locking device 6. When locking device 6 is to be removed from the video game console, the key 9 is rotated a quarter turn in a clockwise direct into its original position, which allows key mechanism 22 to retract, thereby causing actuator 11 to retract. The springs 14 and 15 cause the locking cams 12 and 13 to retract inwardly, which retracts extended portions 12A and 13A, thereby allowing the locking device 6 to be removed from the video game opening of the video game console.

OPERATION

In a typical application, if the video game console is to be locked, the empty cartridge tray is pressed dowardly and the locking device 6 is placed into the video game cartridge recess or opening in the video game console. Once the locking device 6 is in place, the mechanism 22 is pressed in to cause the key mechanism 22 to extend actuator 11 thereby holding actuator 11 in its extended position. The extension of actuator 11 causes cams 12 and 13 to extend outwardly causing the cam extension portions 12A and 13A to extend out of the locking device 6, engaging the side walls on the internal side faces of the recess or opening of the video game console, thereby locking the locking device 6 into place within the cartridge opening of the console to prevent the insertion of video game cartridges within the opening of the video game console.

When normal playing use of the video game console is desired, the key 9 is placed into the key slot 10 and is rotated clockwise a quarter turn. This causes key mechanism 22 to retract, thereby causing actuator 11 to retract, which causes cams 12 and 13 with their extension portions 12A and 13A to retract within the locking device 6, thereby unlocking the locking device 6. The locking device 6 is then removed from the opening of the video game console, and the video game console is ready for normal use.

The method of operating a selectively lockable or unlockable video game apparatus includes the steps as indicated hereafter:

a) providing a locking device 6 which has an external configuration or dimensions that allow the device 6 to fit in the video game cartridge opening for a video game console;

b) providing locking means, cams 12 and 13 with cam extension portions 12A and 13A, in the locking device 6, which cams are moved by a actuator 11; and c) selectively moving the cam actuator 11 such that movement of the cams 12 and 13 with their respective extension portions 12A and 13A is achieved by pushing in the mechanism 22 which extends actuator 11, which causes cam extension portions 12A and 13A to extend outside of the locking device 6 to thereby engage within a portion of video game cartridge recess in a locked position inside of the video game console.

The advantages of the locking device 6 are indicated hereafter:

A) Locking device 6 prevents the entry of a true video game cartridge in the video game console, when in a locked position within the opening of the console.

B) Locking means, cams 12 and 13 (with their extension portions 12A and 13A) or any similar locking mechanism permits locking of the locking device 6 within the console.

C) The person in possession of key 9 is the only person who can remove the locking device 6 from its locking position within the opening of the console. Removal of the locking device 6 from the opening of the console permits anyone to insert a true video game cartridge into the video game cartridge recess or opening in the console, and can thereby operate the console for playing the video game cartridge.

D) Now, a person owning or renting or otherwise using a video game console with the locking device 6 of the subject invention can avoid or prevent the undesired insertion by children of a video game cartridge within the console and can also prevent pranksters from inserting garbage or undesired items or objects into the console through the opening provided by the video game cartridge recess or opening. The preferred material for the construction of the external housing of the locking device 6, as well as the actuator 11, cams 12 and 13, and key 9 is metal or plastic, but other materials such as metal may be used or substituted as well.

While the invention has been described in its preferred embodiment, it is to be understood that the words which have been used are words of description rather than limitation, and that changes may be made within the purview of the appended claims without departing from the true scope and spirit of the invention in its broader aspects.

I claim:

1. A combined video game electronic apparatus and locking device therefor comprising, in combination:

a video game electronic apparatus having an empty game cartridge region;

an openings located in said apparatus with an associated video game cartridge tray means for receiving a video game cartridge, said opening having side faces with recesses when said video game cartridge tray means is depressed in a lower position; and locking device means for insertion within said opening for preventing entry of a video game cartridge in said opening comprising, in combination:

a front plate having a key mechanism with associated key slot, and having a front cavity area;

key means for placing in said key slot, which key means causes movement of said key mechanism in an unlocked position;

an actuator coupled to said key mechanism, said actuator being cylindrical in shape with a portion on an end thereof of reduced diameter;

a back plate fixedly coupled to said front plate, having hole means for allowing said actuator to pass through said back plate, and having a rear cavity area that matches up with said front cavity area in said front plate, thereby defining first and second internal cavities of said locking device means; and first and second cams movably located respectively within said first and second internal cavities of said locking device means, having first and second spring means to provide a force which biases said first and second cams in an inward or retracted position, actuator being a separate element unattached to said first and second cams, said first and second cams positioned against said reduced diameter portion of said actuator, which causes said first and second cams to be fully retracted within said first and second internal cavities of said locking device means, said locking device means thereby being in said unlocked position, with said first and second cams positioned against said actuator such that extension of said actuator pushes said first and second cams in an outward direction, overcoming the biasing force of said first and second spring means, thereby extending said first and second cams outside said first and second internal cavities of said locking device means, thereby engaging said recesses is said side faces of said opening, said locking device means thereby being in a locked position.

2. A method of providing a lockable video game electronic apparatus comprising:

providing a video game electronic apparatus;

providing an opening located in said apparatus with an associated video game cartridge tray means for receiving a video game cartridge, said opening having side faces with recesses when said video game cartridge tray means is empty containing no game cartridge and is depressed in a lower position;

providing locking device means for insertion within said opening for preventing entry of a video game cartridge in said opening, comprising, in combination:

a front plate having a key mechanism with associated slot for a key, and having a front cavity area;

key means for placing in said slot, which key means causes movement of said key mechanism into an unlocked position;

an actuator coupled to said key mechanism, said actuator being cylindrical in shape with a portion on an end thereof of reduced diameter;

a back plate fixedly coupled to said front plate, having hole means for allowing said actuator to pass through said back plate, and having a rear cavity area that matches up with said front cavity area in said front plate, thereby defining first and second internal cavities of said locking device means; and first and second cams movably located respectively within said first and second internal cavities of said locking device means, having first and second spring means to provide a force which biases said first and second cams in an inward or retracted position, said first and second cams positioned said actuator being a separate element unattached to said first and second cams, against said reduced diameter portion of said actuator, which causes said first and second cams to be fully retracted within said first and second internal cavities of said locking device means, said locking device means thereby being in said unlocked position, with said first and second cams positioned against said actuator such that extension of said actuator pushes said first and second cams in an outward direction, overcoming the biasing force of said first and second spring means, thereby extending said first and second cams outside said first and second internal cavities of said locking device means thereby engaging said recesses in said side faces of said opening, said locking device means thereby being in a locked position;
depressing said video game cartridge tray means inside said opening to its lower position;
placing said locking device within said opening means; and
pressing said key mechanism to an inward position which causes said actuator to extend, thereby placing said device in said locked position.

3. The method of claim 2 including the step of rotating said key mechanism by using a suitable key to retract the key mechanism to thereby unlock the locking device means.

* * * * *